United States Patent [19]

Binge

[11] 4,076,191

[45] Feb. 28, 1978

[54] SPACECRAFT COMPONENT ROTATION MEANS

[75] Inventor: Derek Sidney Binge, Hamilton Square, N.J.

[73] Assignee: RCA Corporation, New York, N.Y.

[21] Appl. No.: 672,700

[22] Filed: Apr. 5, 1976

[30] Foreign Application Priority Data

Apr. 29, 1975  United Kingdom ............... 17784/75

[51] Int. Cl.² .......................... B64G 1/10; H02K 5/00
[52] U.S. Cl. ............................... 244/173; 308/184 R; 308/189 A; 310/91
[58] Field of Search ..................... 244/173; 310/66, 91, 310/90; 308/189 A, 184 R, 207 A, 189 R

[56] References Cited

U.S. PATENT DOCUMENTS

| | | | |
|---|---|---|---|
| 2,859,033 | 11/1958 | Rose ................................. | 308/184 R |
| 2,885,583 | 5/1959 | Zunick et al. .................... | 308/184 R |
| 3,148,846 | 9/1964 | Newton ............................. | 244/173 |
| 3,549,220 | 12/1970 | Robinson et al. ................ | 308/184 R |
| 3,668,446 | 6/1972 | Hoyler .............................. | 310/90 |
| 3,777,195 | 12/1973 | Potter .............................. | 308/189 A |
| 3,947,079 | 3/1976 | Anderson ......................... | 308/184 R |

OTHER PUBLICATIONS

Veillette; L. J., *Highlights of a Brushless Direct-Drive Solar Array Control Sys. Design*, Presented at P.C.S. Conf., Apr. 20-21, 1970.

*Primary Examiner*—Trygve M. Blix
*Assistant Examiner*—Galen L. Barefoot
*Attorney, Agent, or Firm*—Robert M. Rodrick; Joseph D. Lazar; H. Christoffersen

[57] ABSTRACT

A bearing and drive mechanism to rotate precisely spacecraft components, in particular, an array of solar panels. A drive shaft in such a mechanism designed for long-life capability is required to have high stiffness in addition to axial and radial constraints for precise rotation relative to a fixed housing. A preloaded pair of duplex, coacting angular contact ball bearings mounted between the shaft and housing provides axial and radial shaft constraint. A single bearing, mounted on an axially compliant diaphragm, is preloaded by resiliently flexing the diaphragm. The preloaded single bearing provides a radial constraint and thus shaft support at the mounting of the single bearing, this additional support increasing the stiffness of the shaft against moments and forces imposed on the shaft. The compliant diaphragm permits axial thermal deflections of the shaft relative to the housing, such deflections caused, under temperature changes, by the difference in thermal expansion properties of the shaft and housing.

10 Claims, 6 Drawing Figures

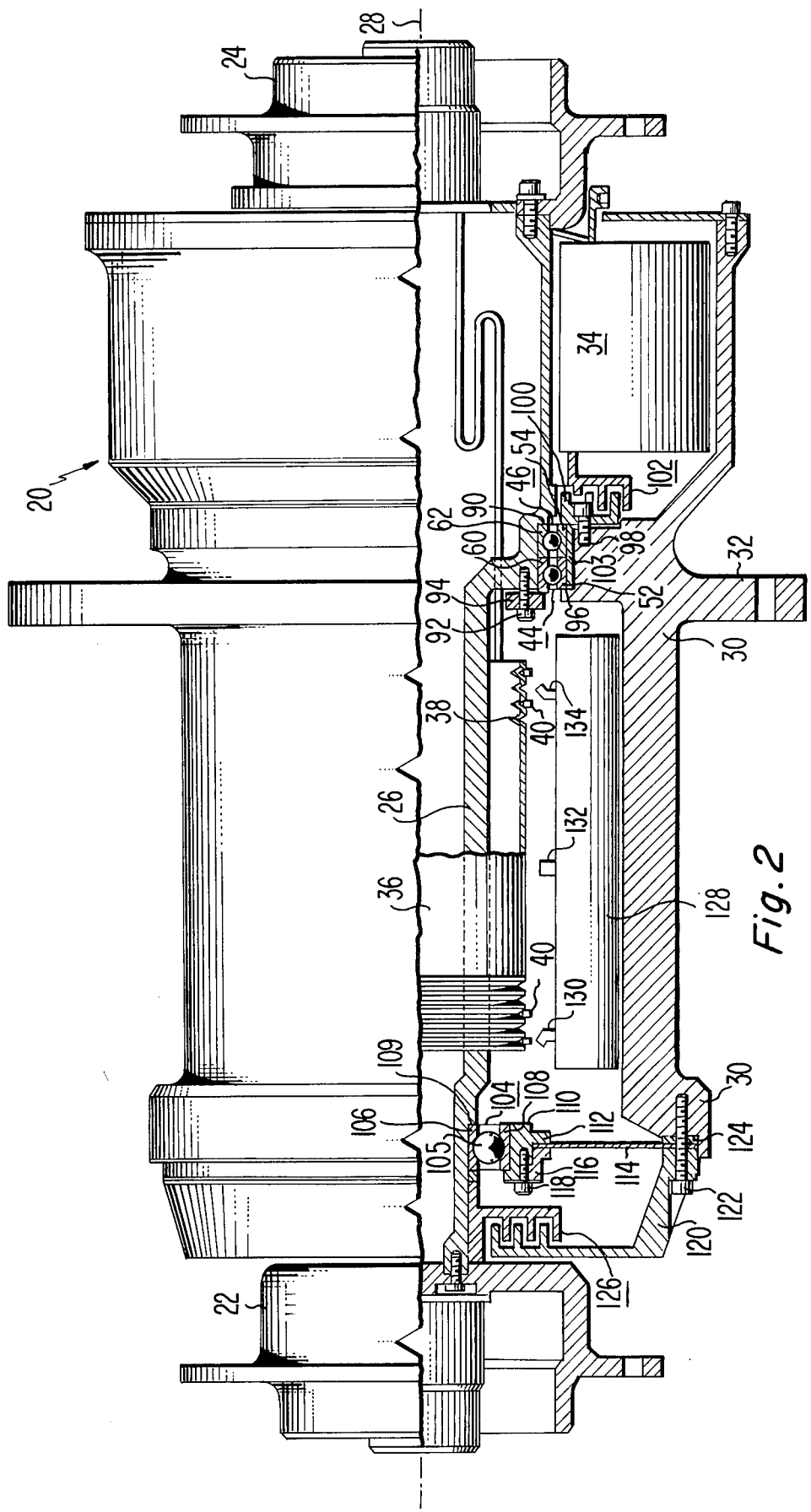

SPACECRAFT COMPONENT ROTATION MEANS

BACKGROUND OF THE INVENTION

1. Field of the Invention

This invention relates to a drive and bearing mechanism to rotate components in a spacecraft and, more particularly, to a solar array drive having a drive shaft rotated precisely and rotatably supported for high shaft stiffness under varying temperature conditions in a space environment.

2. Description of the Prior Art

In structures having an element which is to be rotated very precisely it is required to rotatably support such a member to allow as little free play in the axial and radial directions as possible and minimum bending under application of loads. Rolling-contact bearings, having race supported spherical balls, are commonly used to mount a rotating member, and certain types of bearings when preloaded in an axial direction are known and used to provide the axial and radial constraint of the rotating member. A difficult problem arises in a zero free-play mechanism when the components of such a mechanism are composed of different materials having different temperature coefficients and subjected to varying temperature conditions. Under temperature changes, severe stresses can be induced as a result of different thermal expansion properties of the components, causing loss of precision or a possible failure of the mechanism.

Some prior art devices incorporate helical spring means with rolling-contact bearings to resiliently take up the bearing looseness. Such devices allow for an axially sliding movement of an axially pressed bearing race with respect to the rotating member or housing on which it is mounted. This axial sliding movement can result in a reduction or loss of axial or radial constraints.

United States Pat. No. 2,885,583, issued on May 5, 1959, discloses a rotating structure having a disc spring allowing for expansion and contraction of the operating parts under high temperature and low pressure. The disc spring biases a bearing race axially to restrict the movement of the balls to a single annular path, but allows for movement of the race in a free floating relationship when the forces due to thermal deflections exceed the forces of the disc spring.

In a spacecraft or satellite which utilizes solar array panels for converting solar energy into electrical energy for its power needs, the solar arrays are usually rotated to keep the arrays facing the sun. Maximum exposure requires a precise rotation of the panel to face normal to the sun's rays. A solar array drive coupled to a rotating drive shaft is generally used to rotate the solar arrays while the spacecraft is in orbit. The stiffness of the solar array drive shaft is a critical factor in the attitude control and stability of the spacecraft since the shaft is an integral structural member of the solar array support. Precise rotation of the shaft is also required, to prevent undesirable vibrations which will affect the attitude of the spacecraft and unduly stress the components in the solar array drive.

Achieving high shaft stiffness as well as precision rotation of the shaft in solar array drives has presented difficult shaft mounting problems, especially in spacecraft designed for long-life capability. In particular, rolling-contact bearings used to rotatably support the shaft are often unduly overloaded in an attempt to increase the moment stiffness of the shaft against the forces imposed upon the shaft by the solar panels. Such overloaded bearings result in a reduction of the life of the bearings and hence the life of the spacecraft. Providing adequate thermal compensation for thermal deflections resulting from the differences in thermal expansion properties of the component materials has often required a sacrifice of the shaft stiffness. Such a trade-off of either the shaft stiffness or thermal expansion compensation undesirably reduces the capability of the device and, under severe operating conditions, the life of the device will be curtailed.

SUMMARY OF THE INVENTION

According to the invention, a bearing and drive mechanism to rotate components in a spacecraft, comprises a housing secured to a portion of the spacecraft and a rotatable shaft within the housing. A duplex pair of coacting, rolling-contact bearings is secured to the housing and to the shaft for rotatably supporting the shaft. The rolling-contact bearings are adapted to be preloaded and means are provided to preload the duplex pair of bearings to provide radial and axial constraint and moment stiffness of the shaft relative to the housing. A single rolling-contact bearing, adapted to be preloaded, is secured to the shaft for rotatably supporting the shaft. An axially resilient support having substantially no radial resilience is secured to the single bearing and to the housing, the axially resilient support being elastically flexed to preload the single bearing and provide a radial constraint of the shaft relative to the housing at the mounting location of the single bearing. The radial constraint by the preloaded single bearing provides thereby a rotatable support of said shaft in addition to the rotatable support by the duplex bearings for increased moment stiffness of the shaft.

BRIEF DESCRIPTION OF THE DRAWING

FIG. 2 is a partially sectioned side elevation view of the invention in the embodiment shown in FIG. 1.

DETAILED DESCRIPTION OF THE PREFERRED EMBODIMENT

Figure 1:
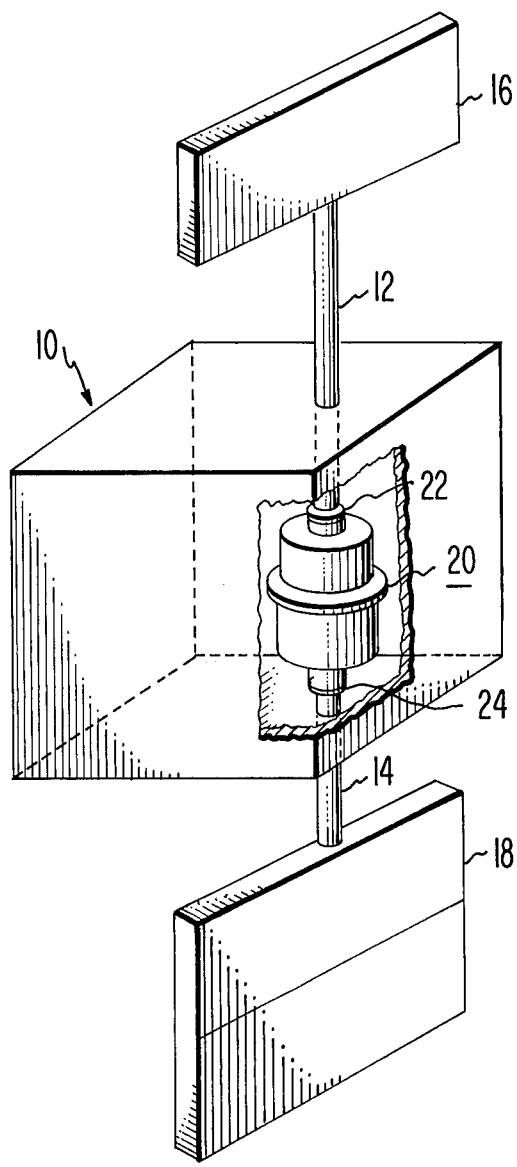
FIG. 1 is a perspective, partially fragmented view of a spacecraft, illustrating the invention in a preferred embodiment as a solar array drive.

Referring to the drawing, there is shown in FIG. 1, a body 10 which may be a satellite or spacecraft of any suitable or desirable shape. Extending from spacecraft 10, in the preferred embodiment of the invention, are shafts 12 and 14 which support solar array panels 16 and 18, respectively. The solar arrays shown are asymmetrical but may also be symmetrical or have only one panel such as either 16 or 18. Shafts 12 and 14 extend through spacecraft 10 to couple solar panels 16 and 18 to drive and bearing mechanism 20 as by solar array connectors 22 and 24. Mechanism 20, shown in more detail in FIG. 2 to be explained subsequently, is used to rotate solar arrays 16 and 18.

In an orbiting spacecraft where solar arrays are utilized to convert solar energy into electrical energy, it is necessary, as indicated in the prior art section, to rotate the array during the spacecraft's orbit to keep the array facing the sun in order to achieve maximum exposure to solar energy. For example, in a spacecraft in a geostationary orbit, the arrays are rotated very slowly such that one revolution is completed in each twenty-four hour period. In a sun synchronous orbit, the arrays are rotated at a faster speed, for example, thirteen revolutions per day depending upon the altitude and orbit of the spacecraft. Spacecraft of either type are typically designed for long-life capability such as, for example 8–10 years, thus requiring high reliability of its components. In designing such a moving mechanical assembly which will be required to perform continuously for up to periods of 10 years, or more, such factors as weight, wear of interfacing parts, lubrication, component stresses and cost must be considered as well as the problems of electrical power consumption and electrical control.

Referring to FIG. 2 there is shown a detailed view of drive and bearing mechanism 20 of FIG. 1 in the embodiment of a solar array drive. A drive shaft 26 is coupled to solar array connectors 22 and 24 and hence to solar array shafts 12 and 14 for rotating solar panels 16 and 18. Shaft 26 rotates about axis 28 and is rotatably supported, as explained below, within a generally cylindrical housing 30, although any housing configuration may be used. Housing 30 is attached in a fixed position relative to spacecraft 10 as by flange 32. Drive shaft 26 is rotated by a motor drive system 34 which utilizes a torque motor to rotate shaft 26 in either a forward or reverse direction. Typical motor drive systems are disclosed in U.S. Pat. No. 3,828,243 issued on Aug. 6, 1974, to RCA Corporation based on the invention of Edwin Goldberg entitled "Motor Speed Control System," and also in United States Patent application, Ser. No. 659,267, filed on Feb. 19, 1976, based on the invention of Richard Julian Treadwell and assigned to RCA Corporation.

As seen in FIG. 2, drive shaft 26 is an integral member in the solar array support structure and therefore a critical parameter in the attitude stability and control of the spacecraft. The stiffness of drive shaft 26 is particularly critical. Free play of the shaft in either the axial or radial direction causes undesirable disturbances and vibrations which adversely affect the attitude of the spacecraft and such effects must be corrected for in the attitude control system resulting thereby in consumption of sometimes limited power. In addition to axial and radial stiffness, it is also required that shaft 26 have a high moment stiffness, i.e., a high resistance to bending about a certain point upon an application of a moment due to any forces imposed on shaft 26. Shaft stiffness is also significant to assure that energy transfer between the solar arrays and the spacecraft's power system, not shown, occurs at maximum or nearly maximum efficiency. A known slip-ring assembly 36 is used to transfer the electrical energy developed by the array to the spacecraft's power system. Slip-ring assembly 36 straddles shaft 26 and is preferably molded directly to shaft 26 to eliminate relative motion between slip-ring assembly 36 and shaft 26. The slip-ring assembly includes a plurality of V-grooves 38 within which a plurality of rectangular cross-section brushes 40 run to conduct the electrical energy derived from the solar cells to the spacecraft. It is essential that brushes 40 track very precisely within ring grooves 38. Any free play in the shaft could cause a change in the position of the brushes and degrade thereby the operation of the spacecraft.

Figure 3A:
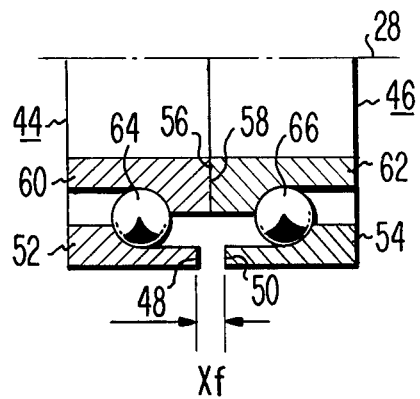
FIGS. 3(a) and (b) are cross-sectional elevation views of a pair of duplex, angular contact, ball bearings in a face-to-face configuration as used in a preferred embodiment of the invention.
Figure 3B:
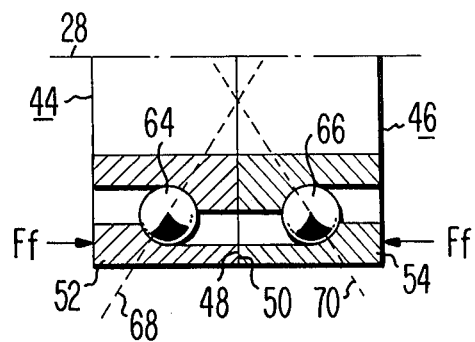

To obtain the required axial and radial stiffness of shaft 26, a duplex pair of coacting, rolling-contact bearings 44 and 46 is provided. Bearings 44 and 46 (see FIG. 3a) are preferably angular contact bearings having a plurality of spherical balls 64 and 66 and inner annular races 60 and 62 and outer annular races 52 and 54, respectively. In the preferred embodiment, bearings 44 and 46 are arranged in a face-to-face configuration as described in more detail below. Bearings 44 and 46 are preloaded to provide the axial and radial constraint of shaft 26. Preloading, as generally defined, is that condition resulting from application of equal and opposite forces on the races of a rolling-contact bearing to sufficiently press the races against the rolling member to eliminate free play in the bearing for supporting both axial and radial loads. As is known in the art, a preloaded angular contact ball bearing will support axial and radial loads while little advantage is gained by using a preloaded bearing of other types such as a deep groove radial or self aligning ball bearing or a roller bearing. In general, shafts or spindles in machine tools or precision equipment which must rotate without play or clearance in either the axial or radial direction can be mounted on preloaded, angular contact ball bearings. Preloading the bearings eliminates the free play in the bearing. Bearing preloading may be more readily understood by reference to FIGS. 3(a) where the duplex pair of angular contact bearings 44 and 46 in the face-to-face configuration is shown in more detail. The faces 48 and 50 of the outer races 52 and 54 of the pair of bearings 44 and 46 are suitably machined to provide a spacing, $X_f$, when the surfaces 56 and 58 of inner races 60 and 62 are in contact. When axial forces $F_f$ are applied to outer races 52 and 54, as shown in FIG. 3(b), the outer races 52 and 54 are forced into contact and the balls 64 and 66 are displaced an amount sufficient to remove all looseness and free play from the bearings 44 and 46 between the balls and the respective raceways. The amount of preloading is determined by the spacing, $X_f$, for a particular size bearing of certain material. For example, for a preload of ten pounds in the axial direction, spacing $X_f$ may be of the order of thirty millionths (0.000030) of an inch; but where the load is several thousand pounds, $X_f$ may be two thousandths (0.002) of an inch. The preload forces are usually determined by analysis or well known charts for desired bearing sizes, the preload forces being those forces required to maintain faces 48 and 50 in contact during the application of expected external forces on the bearings. Any increase in the forces $F_f$ required to eliminate the spacing $X_f$ puts the races in compression. Also, providing too large a spacing, $X_f$ for a particular bearing, overloads the bearing causing excessive wear and reduction in its life. The load paths of such preloaded bearings in the face-to-face configuration are along lines 68 and 70, lines 68 and 70 converging toward the axis of rotation 28.

Figure 4A:
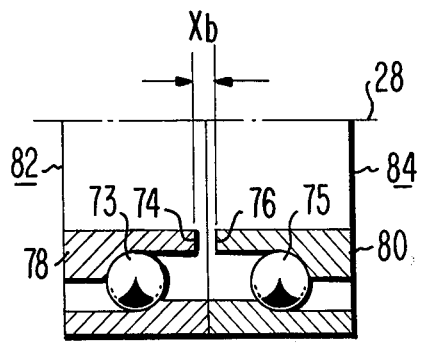
FIGS. 4(a) and (b) are cross-sectional elevation views of a pair of duplex, angular contact, ball bearings in a back-to-back configuration as used in another embodiment of the invention.
Figure 4B:
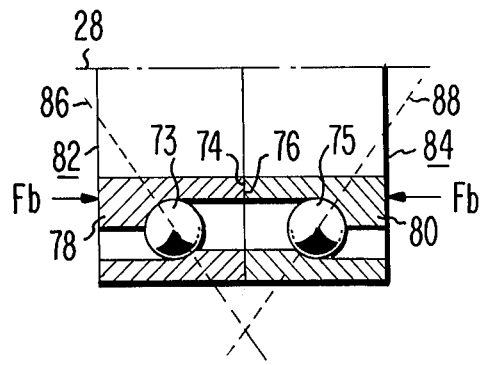

In an alternative embodiment of the invention, there is detailed in FIG. 4(a) a back-to-back bearing configuration in which faces 74 and 76 of inner races 78 and 80 of duplex angular contact bearings 82 and 84 are machined to provide a spacing, $X_b$, when bearings 82 and 84 are mounted as shown. When axial forces, $F_b$, are applied to inner races 78 and 80, as shown in FIG. 4(b), faces 74 and 76 are forced into contact and the balls 73 and 75 are displaced a sufficient amount to remove bearing free play. The loads act along lines 86 and 88, lines 86 and 88 diverging in the direction of axis of rotation 28. The preload forces are determined in a manner similar to the preload forces of the face-to-face configuration. For a further explanation of preloaded bearings, see "Design of Machine Elements," Third Edition, by M. F. Spotts, Prentice Hall, Inc., 1961, pages 341–342.

Because of the directions of the load paths, the face-to-face bearing configuration would produce less moment about shaft 26 than the back-to-back configuration. The lesser moment allows for a greater misalignment between bearings 44 and 46 and shaft 26 due to manufacturing tolerances without unduly overloading the bearings. Greater loads on the bearings, as would result in the back-to-back configuration due to such misalignment, reduce the life of the bearing, even though this configuration would provide for more shaft stiffness. Thus, in the preferred embodiment of the invention, the face-to-face bearing configuration (FIGS. 3a- 3b) is used to provide sufficient axial and radial constraint of shaft 26 with respect to housing 30, as well as for providing longer life by minimizing bearing overloading due to misalignment problems.

Reverting back now to FIG. 2, the inner races 60 and 62 of bearings 44 and 46 are shown mounted on drive shaft 26, preferably by a light interference fit or by a line-to-line contact fit so as to prevent any relative radial movement of inner races 60 and 62 with respect to shaft 26. A shoulder 90, provided on shaft 26, abuts against inner race 62 to restrain axial movement of inner races 60 and 62. A screw 92 by way of bushing 94 presses inner race 60 into contact with inner race 62, the inner races being tightly clamped between shoulder 90 and bushing 94.

A shoulder 96, formed on housing 30, abuts against outer ring 52 to restrain axial movement of the outer races 52 and 54. A screw 98, through the inner portion 100 of an oil seal 102, presses against outer race 54 with sufficient axial force to bring and maintain outer races 52 and 54 into contact thereby preloading the bearings 44 and 46 to provide axial and radial shaft stiffness, as described above. The outer races 52 and 54 are thus tightly clamped between shoulder 96 and inner oil seal portion 100. A cylindrical bushing 103 of suitable material may be placed around outer bearings 52 and 54 in a light press fit to serve as a buffer between bearings 44 and 46 to minimize any thermal stresses which may develop between the bearings 44 and 46 and the housing 30 as a result of different thermal expansion characteristics.

Preloaded duplex bearings 44 and 46 in addition to providing shaft stiffness in the axial and radial direction also provide a certain amount of moment stiffness against moments imposed on shaft 26. The moment stiffness of the shaft 26 can be increased by applying a greater preload to the bearings, but as described above, this greater preload will result in a reduction in the life of the bearing. Therefore, to retain high reliability and long bearing life, a third, single trailer bearing 104 is utilized to increase the moment stiffness of shaft 26. Trailer bearing 104 is preferably an angular contact ball bearing having inner annular race 106 and outer annular race 108 and a plurality of spherical balls 105 equally spaced in the race about the shaft.

In order to increase the moment stiffness of shaft 26 by trailer bearing 104, it is required to rotatably support shaft 26 such that there is no ("zero") radial free play between shaft 26 and housing 30 at the mounting position of trailer bearing 104. The inner race 106 is secured to shaft 26 by a light interference fit to prevent any axial and radial movement of inner race 106 with respect to shaft 26 for subsequent preloading of bearing 104. A shoulder 109 may be formed on shaft 26 to further assure axial constraint and position of inner race 106. A collar 110 is press fit onto outer race 108. A shoulder 112 is formed on collar 110 for receiving and supporting the inner edge of an axially compliant annular diaphragm 114 having substantially no radial resilience. Preferably, diaphragm 114 is secured to collar 110 as by a clamping member 116 tightening diaphragm 114 securely against shoulder 112 by a screw 118. Diaphragm 114 is securely affixed to housing 30 by clamping diaphragm 114 between housing end 120 and housing 30 as by screw means 122. Other suitable means, such as for example, brazing or soldering, may also be used to secure rigidly diaphragm 114 to outer race 108 and housing 30. Trailer bearing 104 is aligned on shaft 26 in such a position so that when housing end 120 is tightened against housing 30, diaphragm 114 is resiliently flexed to urge outer race 108 preferably in the direction toward the duplex bearings 44 and 46, to preload trailer bearing 104. However, depending upon the direction of the angular contact bearing races 106 and 108, outer race 108 may be biased in either axial direction to preload trailer bearing 104. A shim 124, may be provided to compensate for allowable component tolerances as well as tolerances in the alignment of bearing 104 with respect to housing 30 so as to assure sufficient diaphragm flexing for desired bearing preloading.

Preloading angular bearing 104 eliminates looseness and free play in bearing 104 thereby allowing no radial free play and increasing the moment stiffness of shaft 26 by providing a rotatable support in addition to that of the duplex bearings 44 and 46. Furthermore, in addition to providing a preload force to bearing 104, the axially compliant diaphragm 114 also permits axial deflection of shaft 26 relative to housing 30. For example, in solar array drives where weight and strength of the components are significant, housing 30 may be formed of a light magnesium alloy and shaft 26 may be of high strength titanium. Under varying temperature conditions shaft 26 and housing 30 will expand and contract differently due to the difference in thermal expansion rates. Serious stresses may be induced by these differences in expansion or contraction between housing 30 and shaft 26 in an axially constrained system. Diaphragm 114 reduces any serious thermal stresses by flexing with the thermal deflections of shaft 26 relative to housing 30 in either axial direction. The amount of flex of diaphragm 114 by the clamping of diaphragm 114 is sufficient to maintain a minimum bias on bearing 104 under the expected temperature changes. Thus, throughout the range of temperature variations bearing 104 will be preloaded and there will be no relative axial movement of outer race 108 with respect to inner race 106 or with respect to the balls of bearing 104.

The compliant diaphragm 114 of the present invention may be of high strength, high fatigue material which is capable of retaining resilient properties over a variable temperature range. Preferably, for the temperature range from $-5°$ C to $+45°$ C, a suitable diaphragm material is berrylium-copper. Such a diaphragm to provide a preload on trailer bearing 114 of, for example, five pounds may be formed to a thickness of approximately 0.020 inches.

To assure the long-life reliability of the drive and bearing assembly, the duplex pair of bearings 44 and 46, trailer bearing 104 and the cavity of slip-ring assembly 36 are lubricated with a suitable lubricant with additives necessary for long-term stability and wear properties. As shown in FIG. 2, the lubricant is stored in oil reservoir 128 and applied to the bearing and slip-rings by suitable transfer means, such as, for example, through conduits 130, 132 and 134 respectively, and preferably using molecular flow techniques. Labyrinth oil seals 102 and 126, located at each end of slip-ring assembly 36, respectively, provide a difficult path for escaping oil molecules, such seals having a lubricant loss rate sufficiently low to contain the lubricant over an 8 to 10 year period.

It can now be appreciated that a precision rotational drive and bearing mechanism, such as herein described, can be used for precise shaft rotation having high radial, axial and moment stiffness and a long-life capability useful, particularly, as a solar array drive. The bearing design utilizes a preloaded duplex pair of angular contact bearings to support drive shaft 26 and to provide axial and radial shaft constraint and some moment stiffness, thereof. In addition, trailer bearing 114 is mounted on an axially compliant diaphragm 114 to provide increased moment stiffness of shaft 26 and no radial free play while permitting thermal deflections of housing 30 relative to shaft 26. Such a drive and bearing mechanism provides for precise tracking of the slip-ring brushes 40 in their grooves 38 and for improved spacecraft attitude stability and control by minimizing disturbances and vibrations due to forces and moments imposed on shaft 26.

Although the invention has been described in the embodiment of a solar array drive, it will be appreciated by those skilled in the art that the present invention can be utilized in spacecraft to rotate antennas, scanning sensors or other instruments on rotatable platforms which require precise rotation and high stiffness of the shaft driving such components.

What is claimed is:

1. A solar array drive apparatus for rotating at least one array of solar panels in a spacecraft adapted for orbital operation, comprising:
   a housing secured to a portion of said spacecraft;
   a rotatable shaft within said housing;
   a duplex pair of coacting rolling-contact bearing means secured to said shaft and to said housing to rotatably support said shaft relative to said housing, said duplex bearing means being adapted to be preloaded;
   means to preload said duplex bearing means to a predetermined force to provide thereby radial and axial constraint and moment stiffness of said shaft relative to said housing;
   a single rolling-contact bearing means secured to said shaft for rotatably supporting said shaft, said single bearing means adapted to be preloaded;
   axially resilient support means having substantially no radial resilience secured to said single bearing means and to said housing;
   means for elastically flexing said axially resilient support means to preload said single bearing means to provide a radial constraint of said shaft relative to said housing and thereby a rotatable support of said shaft in addition to said rotatable support by said duplex bearing means for increased moment stiffness of said shaft;
   motor means for rotating said shaft; and
   means for connecting said shaft to said array of solar panels.

2. A solar array drive apparatus, according to claim 1, wherein said axially resilient support means comprises a diaphragm.

3. A solar array drive apparatus, according to claim 1, wherein said single bearing means is an angular contact bearing having a plurality of spherical balls and an inner and outer cooperating race.

4. A solar array drive apparatus, according to claim 1, wherein said duplex pair of bearing means are angular contact bearings, each of said bearings having a plurality of spherical balls and an inner and outer cooperating race.

5. A solar array drive apparatus, according to claim 4, wherein a predetermined spacing is provided between the outer corresponding races of said coacting duplex bearings whereby said preload force is applied to said duplex bearings when said spacing is eliminated by said preload means and said outer corresponding races are urged into contact.

6. A solar array drive apparatus, according to claim 4, wherein a predetermined spacing is provided between the inner corresponding races of said coacting duplex bearings whereby said preload force is applied to said duplex bearings when said spacing is eliminated by said preload means and said inner corresponding races are urged into contact.

7. A solar array drive apparatus, according to claim 1, further comprising brush and ring means responsive to the rotation of said shaft for conducting electrical energy developed by said solar panels to said spacecraft.

8. A solar array drive apparatus, according to claim 1, further comprising:
   a fluid lubricant for lubricating said bearing means;
   means for applying said lubricant to said bearing means;
   reservoir means for containing said lubricant; and
   seal means to substantially prevent leakage of said lubricant.

9. A bearing and drive mechanism to rotate components in a spacecraft, comprising:
   a housing secured to a portion of said spacecraft;
   a rotatable shaft within said housing;
   a duplex pair of coacting rolling-contact bearing means secured to said shaft and to said housing to rotatable support said shaft relative to said housing, said duplex bearing means being adapted to be preloaded;
   means to preload said duplex bearing means to a predetermined force to provide thereby radial and axial constraint and moment stiffness of said shaft relative to said housing;
   a single rolling-contact bearing means secured to said shaft for rotatably supporting said shaft, said single bearing means being adapted to be preloaded;
   axially resilient support means having substantially no radial resilience secured to said single bearing means and to said housing; and
   means for elastically flexing said axially resilient support means to preload said single bearing means to provide a radial constraint of said shaft relative to said housing and thereby a rotatable support of said shaft in addition to said rotatable support by said duplex bearing means for increased moment stiffness of said shaft.

10. A bearing and drive mechanism, according to claim 9, wherein said axially resilient support means comprises a diaphragm.

* * * * *